(12) United States Patent
Clinton et al.

(10) Patent No.: US 10,902,005 B2
(45) Date of Patent: *Jan. 26, 2021

(54) PARALLEL SCORING OF AN ENSEMBLE MODEL

(71) Applicant: INTERNATIONAL BUSINESS MACHINES CORPORATION, Armonk, NY (US)

(72) Inventors: Julian J. Clinton, Surrey (GB); Niall F. McCarroll, Berkshire (GB); Lei Tian, Shaanxi (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 619 days.

This patent is subject to a terminal disclaimer.

(21) Appl. No.: 15/794,213

(22) Filed: Oct. 26, 2017

(65) Prior Publication Data

US 2018/0060330 A1    Mar. 1, 2018

Related U.S. Application Data

(63) Continuation of application No. 15/247,965, filed on Aug. 26, 2016, now Pat. No. 10,650,008.

(51) Int. Cl.
*G06F 16/2457* (2019.01)
*G06F 16/28* (2019.01)

(52) U.S. Cl.
CPC ...... *G06F 16/24578* (2019.01); *G06F 16/285* (2019.01)

(58) Field of Classification Search
CPC .................... G06F 16/24578; G06F 16/285

USPC ....................................................... 707/748
See application file for complete search history.

(56) References Cited

U.S. PATENT DOCUMENTS

| 6,260,033 B1 | 7/2001 | Tatsuoka |
| 8,868,472 B1 | 10/2014 | Lin et al. |
| 9,098,326 B1 | 8/2015 | Martin et al. |
| 2007/0174290 A1 | 7/2007 | Narang et al. |

(Continued)

OTHER PUBLICATIONS

"PMML 4.1—Multiple Models: Model Composition, Ensembles, and Segmentation"; Retrieved Online from http://dmg.org/pmml/v4-1/MultipleModels.html on Aug. 8, 2016; 15 Pages.

(Continued)

*Primary Examiner* — Hosain T Alam
*Assistant Examiner* — Saba Ahmed
(74) *Attorney, Agent, or Firm* — Cantor Colburn LLP; Richard Wilhelm

(57) ABSTRACT

Method and systems for parallel scoring an ensemble model are provided. Aspects include loading data into a first distributed data structure having a plurality of partitions, each partition having loaded data in the form of a set of pairs of data formed of a record to be scored and a partial score for that record. A component model in the ensemble model is selected and processing of the records carried out in parallel across the partitions including updating the partial score for each record. In response to a partial score for a record not meeting an accuracy threshold, the method retains the record in the first distributed data structure to be scored by a subsequent component model. In response to the partial score for a record meeting the accuracy threshold, the method moves the record and updated partial score to an output result data structure to provide a final score.

9 Claims, 7 Drawing Sheets

(56) References Cited

U.S. PATENT DOCUMENTS

| | | |
|---|---|---|
| 2013/0124474 A1 | 5/2013 | Anderson |
| 2014/0279745 A1 | 9/2014 | Esponda et al. |
| 2014/0280065 A1 | 9/2014 | Cronin et al. |
| 2014/0379310 A1 | 12/2014 | Ramachandran et al. |
| 2015/0254568 A1 | 9/2015 | Zhao et al. |
| 2015/0339572 A1 | 11/2015 | Achin et al. |
| 2015/0356149 A1 | 12/2015 | Dagli et al. |
| 2016/0048766 A1 | 2/2016 | McMahon et al. |
| 2018/0060324 A1 | 3/2018 | Clinton et al. |

OTHER PUBLICATIONS

Basilico et al.; "Comet: A Recipe for Learning and Using Large Ensembles on Massive Data"; Retrieved Online from http://arxiv.org/pdf/1103.2068.PDF on Sep. 8, 2011; 10 Pages.

Bonissone; "Lazy-Meta Learning: Creating Customized Model Ensembles on Demand"; Retrieved Online from htpps://www.researchgate.net/publication/257931478 Aug. 8, 2016; 25 Pages.

Diao et al.; "Feature Selection Inspired Classifier Ensemble Reduction"; IEEE Transactions on Cybernetics; vol. 44, No. 8; Aug. 2014; pp. 1259-1268.

Peng et al.; "Ensemble of Softtware Defect Predictors: An AHP-Based Evaluation Method"; International Journal of Information Technology & Decision Making; vol. 10, No. 1; Jan. 2011, pp. 187-206.

Solazzo et al.; "Model Evaluation and Ensemble Modelling of Surface-Level Ozone in Europe and North America in the Context of AQMEII"; Atmospheric Environment; 41 Pages.

Zhang et al.; "Enabling Fast Prediction for Ensemble Models on Data Streams"; KDD'11; Aug. 21-24, 2011; pp. 177-185.

Apache Flink "Stateful Computations over Data Streams" retrieved at: https://flink.apache.org/; downloaded Sep. 3, 2020; 3 pgs.

Apache Spark "Lightning-fast unified analytics engine" retrieved at: http://spark.apache.org/; downloaded Sep. 3, 2020; 5 pgs.

Linton et al., "Parallel Scoring of an Ensemble Model"; U.S. Appl. No. 15/247,965, filed Aug. 26, 2016.

List of IBM Patents or Patent Applications Treated as Related; (Appendix P), Date Filed Oct. 26, 2017; 2 pages.

PARALLEL SCORING OF AN ENSEMBLE MODEL

DOMESTIC PRIORITY

This application is a continuation of the legally related U.S. application Ser. No. 15/247,965 filed Aug. 26, 2016, which is fully incorporated herein by reference.

BACKGROUND

The present invention relates to parallel scoring of an ensemble model, and more specifically, to parallel scoring of ensemble predictive models using lazy evaluation.

In predictive analytics, an ensemble model consists of multiple base models. To score an ensemble model the base models are each scored and the scores are combined to produce a final score for the ensemble model. Ensemble models are often more accurate than single predictive models but their increased complexity means that they can take much more time to score.

SUMMARY

According to a first aspect of the present invention there is provided a computer implemented method of parallel scoring an ensemble model, the ensemble model comprising a set of component models, each component model having a relative weighting, the method comprising: loading data into a first distributed data structure comprising a plurality of partitions, each partition having loaded data in the form of a set of pairs of data formed of a record to be scored and a partial score for that record; selecting a component model in the ensemble model in order of decreasing weighting and processing the records in parallel across the partitions including updating the partial score for each record; for each record in the first distributed data structure determining if a partial score meets an accuracy threshold, and wherein: in response to a partial score for a record not meeting an accuracy threshold retaining the record in the first distributed data structure in order to be scored by a subsequent component model; and in response to the partial score for a record meeting the accuracy threshold, moving the record and updated partial score to an output result data structure to provide a final score for the record.

According to a second aspect of the present invention there is provided a system for parallel scoring an ensemble model, the ensemble model comprising a set of component models, each component model having a relative weighting, the system comprising: a processor and a memory configured to provide computer program instructions to the processor to execute the function of the components; an initializing component for loading a first distributed data structure comprising a plurality of partitions, each partition having loaded data in the form of a set of pairs of data formed of a record to be scored and a partial score for that record; a list of component models of an ensemble model provided in order of decreasing weighting of the component models; a component model selecting component for selecting a component model from the next in the list; a component model processing component for processing the records in parallel across the partitions for the selected component model including updating the partial score for each record; a score sufficiency component for determining for each record in the first distributed data structure if a partial score for a record meets an accuracy threshold, and in response to a partial score for a record not meeting an accuracy threshold retaining the record in the first distributed data structure in order to be scored by a subsequent component model and in response to the partial score for a record meeting the accuracy threshold, moving the record and updated partial score to an output result data structure to provide a final score for the record.

According to a third aspect of the present invention there is provided a computer program product for parallel scoring an ensemble model, the ensemble model comprising a set of component models, each component model having a relative weighting, the computer program product comprising a computer readable storage medium having program instructions embodied therewith, the program instructions executable by a processor to cause the processor to: load data into a first distributed data structure comprising a plurality of partitions, each partition having loaded data in the form of a set of pairs of data formed of a record to be scored and a partial score for that record; select a component model in the ensemble model in order of decreasing weighting and processing the records in parallel across the partitions including updating the partial score for each record; for each record in the first distributed data structure determine if a partial score meets an accuracy threshold, and wherein: in response to a partial score for a record not meeting an accuracy threshold retain the record in the first distributed data structure in order to be scored by a subsequent component model; and in response to the partial score for a record meeting the accuracy threshold, move the record and updated partial score to an output result data structure to provide a final score for the record. Advantageously, such a technique can quicker allow for model evaluations, or alternatively model evaluations using fewer computing resources. Example models allow for analytics to be used in anomaly detection in a wide range of industries, such as healthcare, or in transport engine analysis.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system provide efficient scoring in predictive analytics using an ensemble model consisting of multiple base models. Scoring efficiency is critical when large numbers of records need to be scored and the ensemble model contains a large number of base models. In such cases, it is necessary to adopt the most efficient approach to scoring ensemble models, but in a way that can also be made to work in parallel to operate on big data.

The described method and system reduce the time taken to score ensemble predictive models on large data sets for those situations where only a sufficiently accurate score is required. This is achieved by skipping the scoring of some of the remaining base models for each record once a sufficiently accurate score has been computed for that record from a subset of the base models. Because unnecessary work is avoided, this is termed as lazy evaluation.

The described method and system provide a mechanism for implementing lazy evaluation of ensemble model scoring in a big data context, using a cluster computing framework. The cluster computing framework may be, for example, the Apache Spark framework or other similar frameworks such as Apache Flink (Apache Spark and Apache Rink are trademarks of Apache Software Foundation).

The described technique may be used generally by plugging in different strategies for ensemble models. To illustrate the approach it is described specifically for ensembles of binary classifiers where the ensemble strategy is a weighted average of the propensity scores of the individual classifiers.

The described method provides sorted lazy ensemble evaluation using a-priori weightings of the members of the ensemble.

Figure 1:
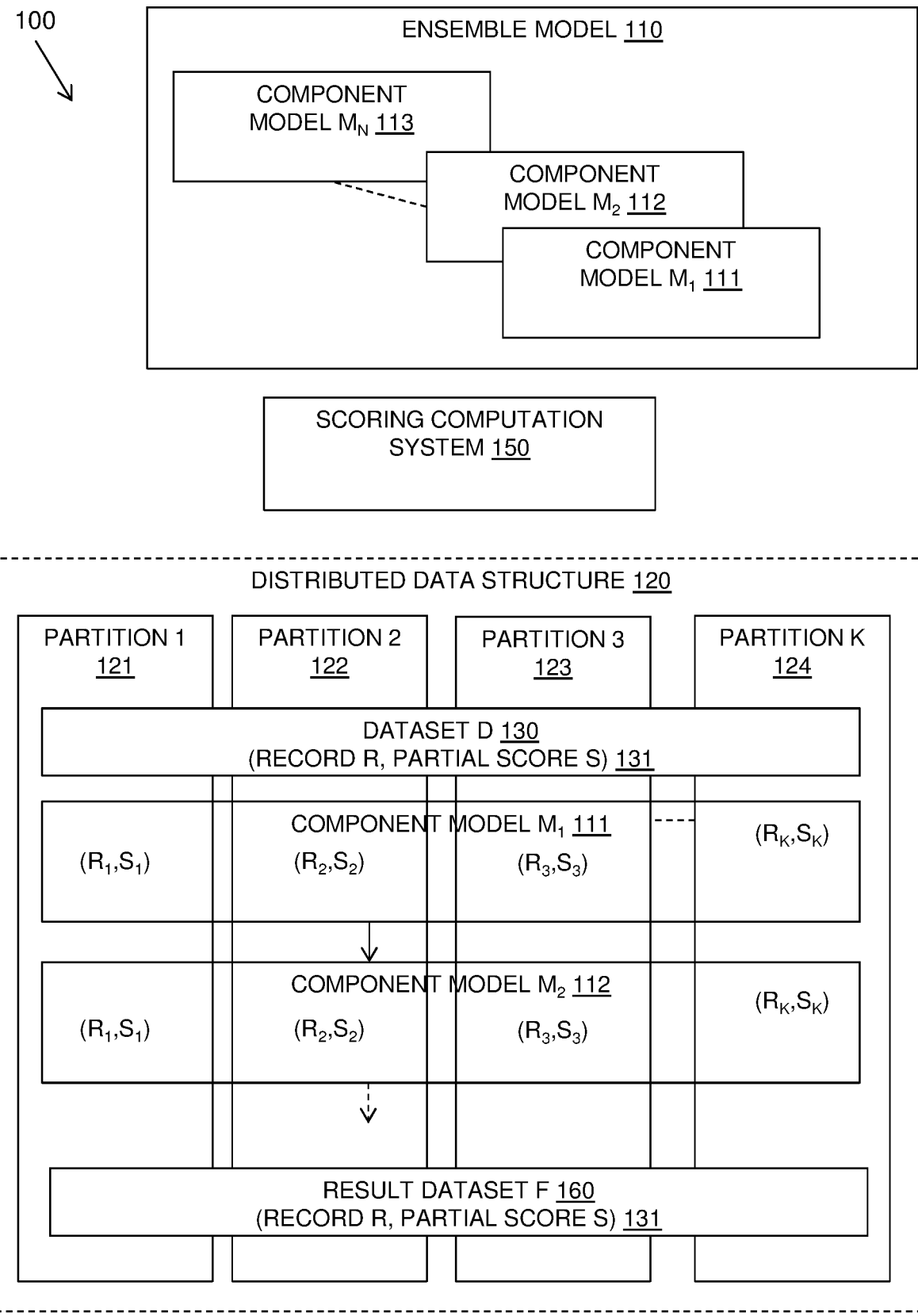
FIG. 1 is a schematic diagram of a method in accordance with the present invention.

Referring to FIG. 1, a schematic diagram 100 illustrates the described method and system.

An ensemble model E 110 consists of a list of N component models (also referred to as base models) Mi 111-113. Each component model Mi in the ensemble model E has an associated weight computed by weight (Mi). Note that sum(weight(Mi))=1.0 for all i in 1 . . . N. Component models with a higher weight have a larger influence on the final ensemble score, and this list is ordered in terms of decreasing weight, so that weight(Mi)≥weight(Mj) for i, j in 1 . . . N and j>i.

A scoring computation system 150 with distributed storage may be provided, for example, Apache Spark that can load data into a distributed data structure 120. Items may be randomly partitioned across a cluster having multiple partitions 121-124 and where each partition is stored in memory on particular node(s) within a cluster. In such systems, computations on the partitions generally occur locally on the node where the partition is stored, and can efficiently read and update the partitions independently and in parallel, over multiple iterations.

A dataset D 130 contains a collection of pairs (R,S) 131, where R is a record to be scored and S is a data structure containing the initialized partial score.

The term RDD (resilient distributed dataset) is used to refer to the described distributed data structure. An original RDD is provided named D 130 composed of K partitions Dk 121-124 for k=1 . . . K, each partition containing many pairs (R,S) 131 consisting of a record R to be scored and initialized partial scores data structure S for that record. An algorithm for lazily scoring the ensemble model E in parallel and delivering the results to output RDD named F composed of K partitions Fk for k=1 . . . K can be implemented using the described approach.

The algorithm may be provided by the scoring computation system and may be an ensemble algorithm describing the following:

A description of the partial score data structure and its initial state.

A function S', wherein componentScore(R,S,M)→S'; score record R using component model M and partial score data structure S describing the partial score already computed for R. Return an updated partial score data structure S'.

A function terminateScoring(S)→true|false; wherein the function returns true, if and only if, the partial score stored in data structure S is sufficiently accurate for the current predictive problem being addressed.

For each component model 111-113 in the ensemble model 110, selected in order of decreasing weight, all rows in the first dataset D 130 are scored for which the score is not already sufficiently determined, in parallel across the cluster. For each record that was scored, if the record's final score is sufficiently determined, the record and associated scores are moved from the input dataset D 130 to the output dataset F 160.

In pseudo code the algorithm may be written as:

```
set i = 1
initialize Fk to empty collection for all k in 1..K
while i ≤ N and D is not empty {
    for each k in 1..K do |in parallel| {
        for each (R,S) in Dk {
            S' <- componentScore(R,S,Mi)
            if terminateScoring(S') {
                append (R,S') to Fk
            } else {
                replace(R,S) with (R,S') in Dk
            }
        }
    }
    i <- i+1
}
```

Figure 2:
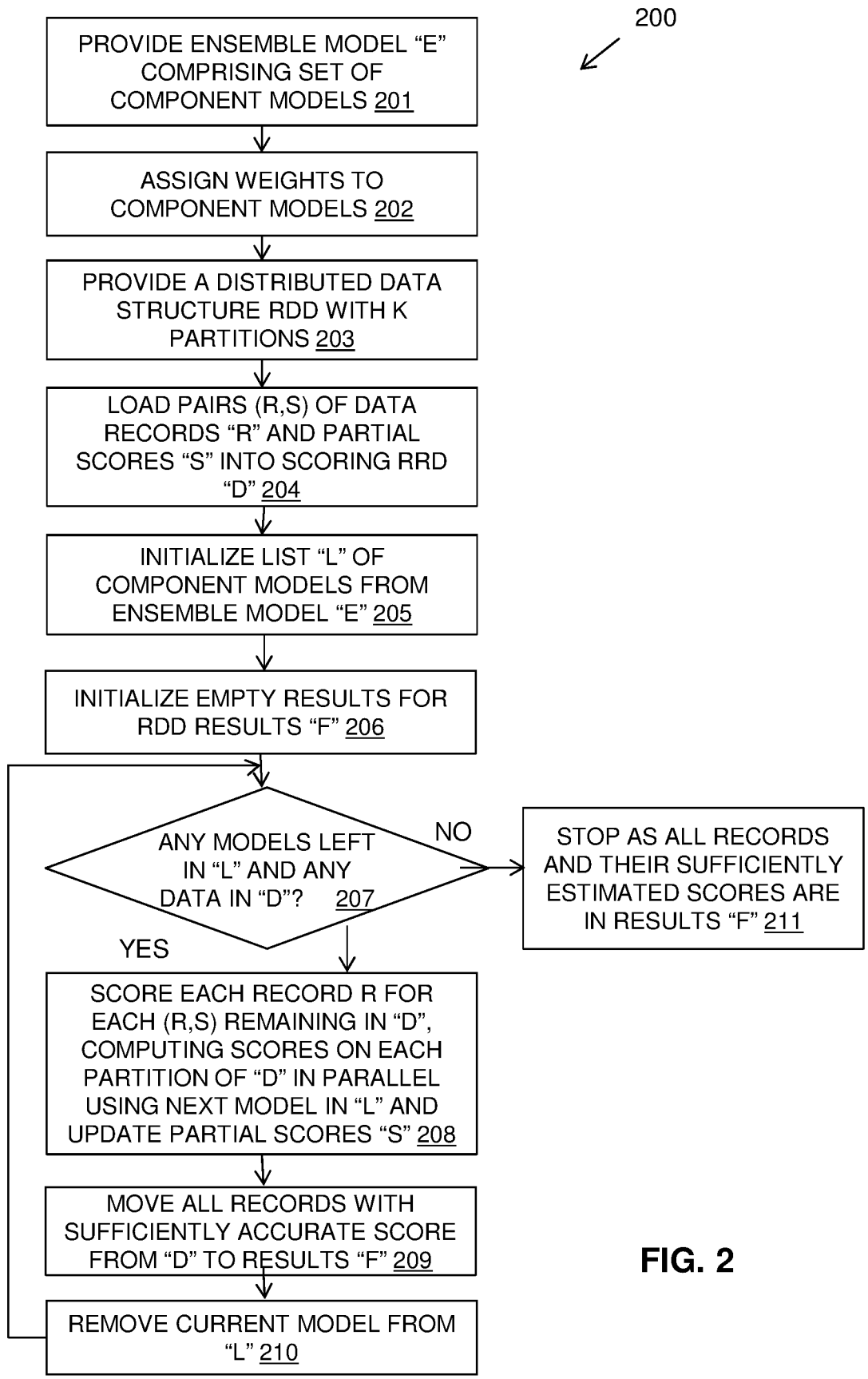
FIG. 2 is a flow diagram of an example embodiment of an aspect of a method in accordance with the present invention.

Referring to FIG. 2, a flow diagram 200 is provided of an example embodiment of the described method of parallel scoring of an ensemble model. An ensemble model E is provided 201 comprising a set of component models. Each component model is assigned a weight 202. Component model weights may be automatically assigned by the model building algorithms, for example, allocating higher weights to better performing component models. Alternatively, the weights may be manually specified or adjusted by a human expert.

A distributed data structure may be provided 203 with K partitions. Data is loaded 204 into the scoring distributed data structure D, with each partition comprising a set of pairs (R, S). R comprises a record to be scored, and S comprises initialized partial scores data structure for that record. Each pair (R, S) is assigned to one and only one partition.

A list L of component models may be initialized 205 from the ensemble model with the component models in decreasing order of their weighting. An empty results dataset F may be initialized 206.

It may then be determined 207 if any models are left in the list L of component models and if any data is left in the dataset D.

Each record R from each partition of dataset D is scored 208 using the same current component model. Scoring of the records R in each partition happens in parallel tasks. The partial scores S for each record R are updated.

When each record R is scored with a component model, its partial score S is updated to yield a more accurate estimate of what the full score would be. Once that partial score S is sufficiently accurate, that record R does not need to be scored by any remaining component models and it is moved from the dataset D to the results dataset F.

If a record's partial score S is updated and is not sufficiently accurate, the record R is retained in the partition of dataset D to be scored by remaining component models.

The current model may then be removed 210 from the list of models.

The method may then loop to determine 207 if there are any models left in the list L of models and any data left in dataset D and may repeat the scoring.

If there are no more component models left in the model list or there are no more records in the dataset D, then the method may stop. The method will have either used all the component models or all the records may have reached sufficiently accurate scores. The records and their sufficiently estimated scores are in the results dataset 211.

The ensemble algorithm may be provided as a pluggable ensemble algorithm and may specify the details of what is stored in the partial scores data structure. How the ensemble algorithm is updated with the scores from each component model, and how the partial scores data structure is assessed to see if the results are sufficiently exact depend on the model type (e.g. regression, classification) and the ensemble method type. For example, in one embodiment propensity based scoring for binary classification problems is provided for determining sufficient accuracy of the partial scores and, in a second embodiment, a method for classification amongst N classes is provided. Details of these two examples are given below and it will be appreciated that other forms of determining if a partial score is sufficient may be used.

In a first embodiment, a pluggable ensemble algorithm may be provided for determining a sufficiently accurate score for records using binary classification based on propensity.

This scoring approach may compute the exact ensemble score as the weighted average of individual propensity scores from each model. A propensity score is the estimate of the probability of a particular outcome out of the two possible outcomes. For example, if the method is modeling outcomes PURCHASE and DID_NOT_PURCHASE, the propensity may typically be based on the estimated probability of the PURCHASE outcome. Note that all individual and ensembled propensity scores must lie in the interval [0.0, 1.0].

This ensemble algorithm for classification models is termed weightedAverage in the PMML4.1 "Multiple Models: Model Composition, Ensembles, and Segmentation" standard.

A partial scores data structure may be provided that consists of a pair of two floating point values, a lower bound propensity (LBP) and an upper bound propensity (UBP). The lower bound propensity LBP is initialized to 0.0 and the upper bound propensity UBP is initialized to 1.0. These values indicate the range within which the fully ensembled propensity result must reside. As the record is scored with successive component models, the range will steadily narrow. If all base models were to be scored, the LBP and UBP would be equal.

The componentScore(R,S,M) function may be provided as follows:

(1) first score record R, using model M, to obtain a propensity value P (a floating point number within the interval [0.0, 1.0])

(2) if S is (LBP,UPB) then return (LBP',UBP') computed from (LBP,UBP) using:

$$LBP'=LBP+\text{weight}(M)*P$$

$$UBP'=UBP-\text{weight}(M)*(1-P)$$

The terminateScoring(S) function may be provided as follows:

The terminateScoring function may define a threshold of interest T between 0 and 1.0. If S is (LBP,UBP) then this function may return true if and only if either LBP>T or UBP<T. At this point the exact propensity will be determined to be either greater than or less than T. A typical value for T would be 0.5, but a different threshold may be selected depending on the problem context, for example, to bias decisions towards or away from false positive errors.

Figure 3:
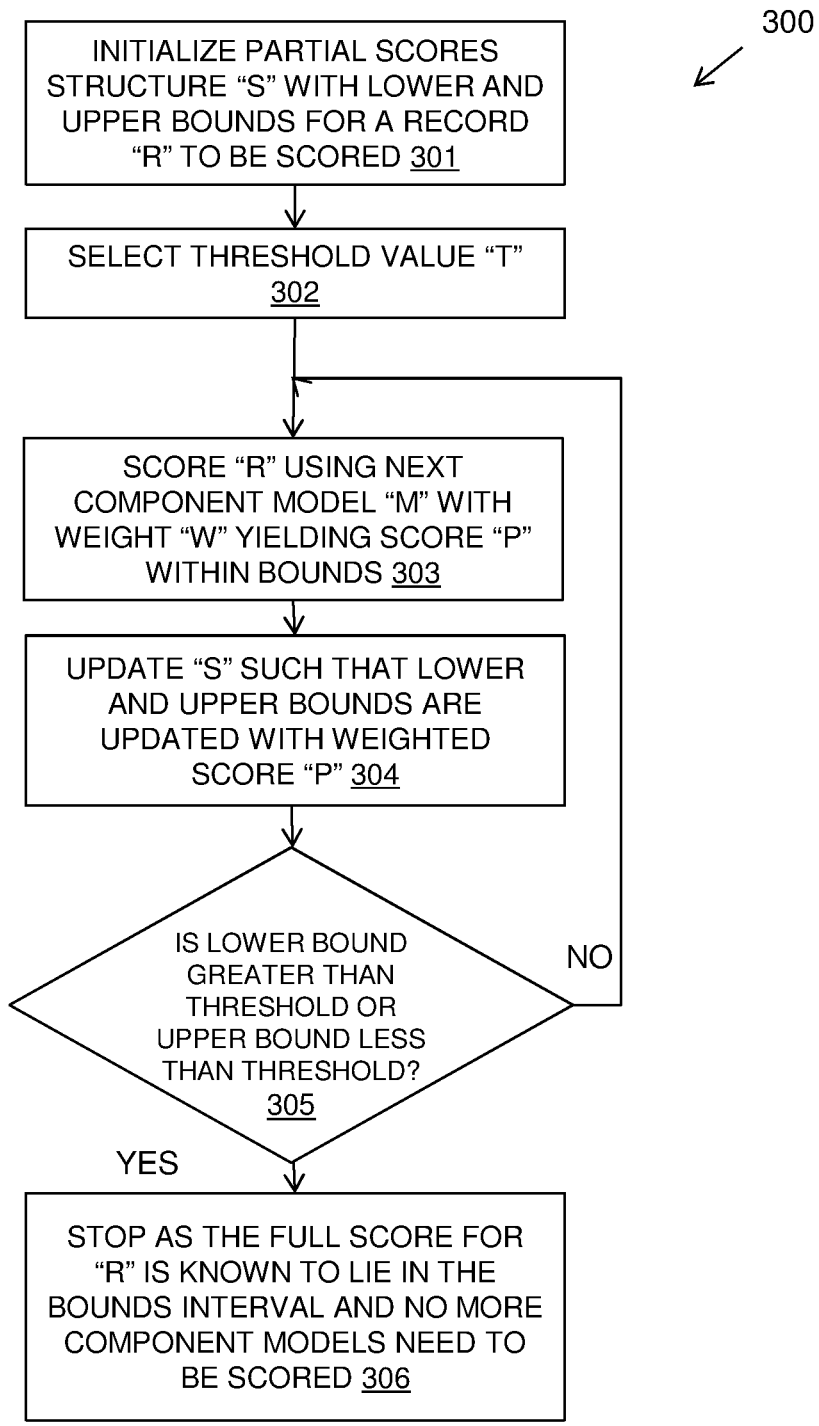
FIG. 3 is a flow diagram of an example embodiment of an aspect of a method in accordance with the present invention.

Referring to FIG. 3, a flow diagram 300 shows an example embodiment determining a sufficiently accurate score based on the above method of binary classification based on propensity.

A partial scores structure S may be initialized 301 with lower and upper bounds for a record R to be scored. A threshold value T may also be selected 302.

A record R may be scored 303 using a next component model M with weight W yielding score P within the bounds. S may be updated 304 such that the lower and upper bounds are updated with the weighted score P.

It may be determined 305 if the lower bound is greater than the threshold T or the upper bound is less than the threshold T. If not, the method may loop to score R using the next component model. However, if the lower bound is greater than the threshold T or the upper bound is less than the threshold T, then the method may stop 306 as the full score for R is now known to lie within an interval that does not include T and no more component models need to be scored.

In a second embodiment, a simple pluggable method for classification amongst N classes is described for determining a sufficiently accurate score for records. This method works for situations where the underlying component models produce a prediction from the set {class 1, class2, . . . classN} specifying which class is predicted. For these kinds of classification model, there are more than two possible outcomes—for example, consider a model which predicts a person's favorite color from the choices (red, green, blue, orange).

"Voting" may be presented that is suitable for classification problems for two or more classes where the component model predictions return just the class to be predicted. Ensemble predictions are made by weighted voting amongst the component models, where each component model votes for a particular class with its weight, and the final predicted class is the one with the most weighted votes. It should be noted that weights must be allocated so that all weights sum to 1.

In this pluggable method, for a ensemble classification model which can predict one of N possible classes (where N≥2) the partial scores structure contains N values (T1, T2, . . . TN) that are initially set to 0 and specify the partial score allocated during ensemble scoring to each class (class1, class 2, . . . , class N). T1 is the partial score associated with a prediction of class1, T2 is the partial score associated with a prediction of class2 and so on.

The componentScore(R,S,M) function may be provided by the following.

Let SCORE=a value in set {class1, class2, . . . , classN} computed by scoring record R with Component Model M. If S is (T1, T2, . . . , TN) then return updated partial scores structure S' as (T1', T2', . . . , TN')

where T1'=if SCORE=class1 then T1+weight(M) else T1 where T2'=if SCORE=class2 then T2+weight(M) else T2

. . .

where TN'=if SCORE=classN then TN+weight(M) else TN

At any point, the best estimate of the weighted vote will be the class with the highest associated partial score value, or indeterminate if there is a tie between two or more partial scores.

The terminateScoring(S) function may be provided as follows: Partial scores may be deemed sufficiently accurate when the highest of the partial scores in (T1, . . . , TN) exceeds the next highest partial score(s), by an amount that is more than the sum of the weights of the remaining models to be scored. At this point it is known that the best estimate of the score for that particular record will not change even if all remaining component models are scored.

Figure 4:
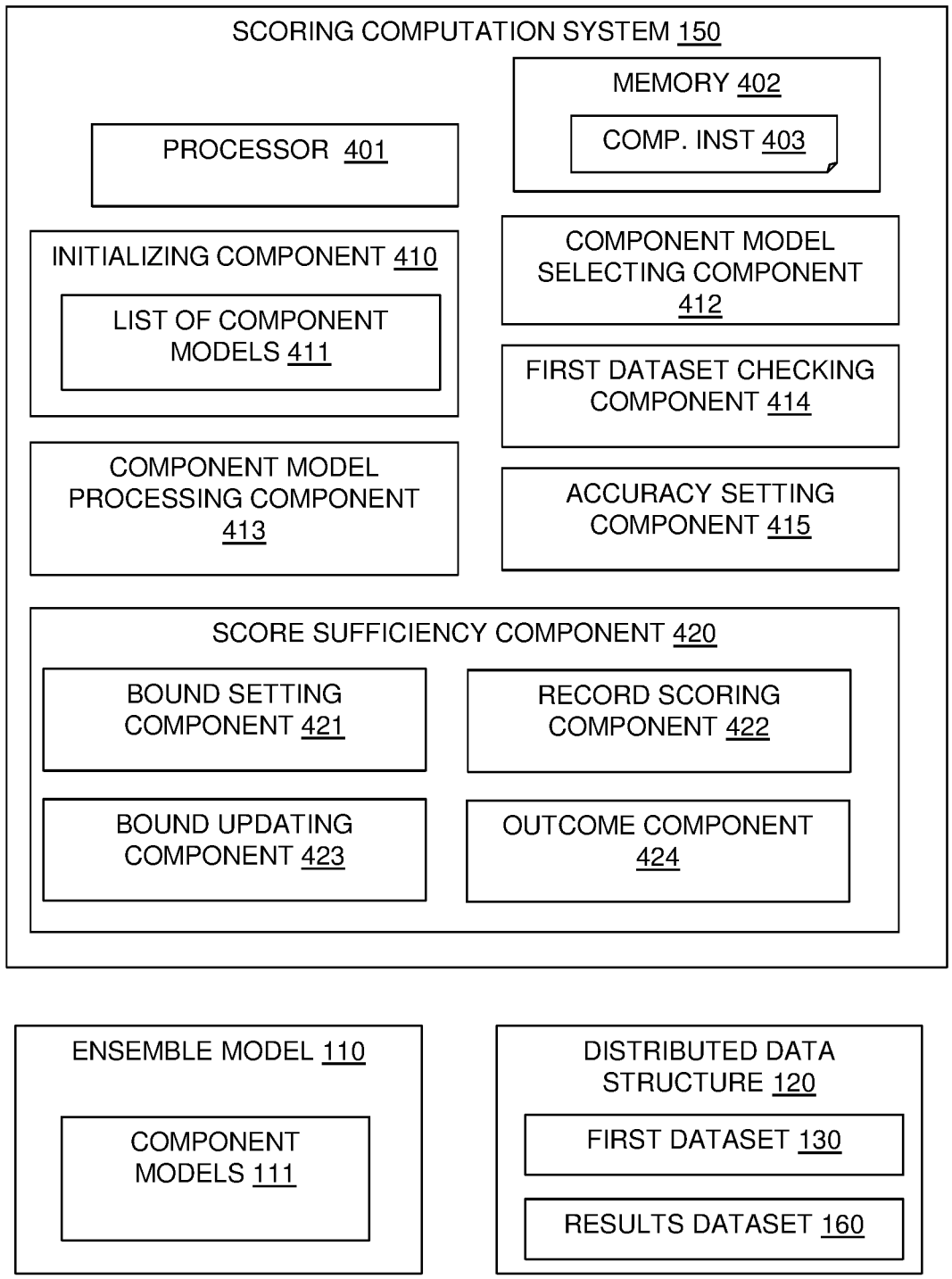
FIG. 4 is block diagram of an example embodiment of a system in accordance with the present invention.

Referring to FIG. 4, a block diagram shows an example of a scoring computation system 150 which may function in conjunction with an ensemble model 110 and distributed data structure 120 as described in FIG. 1 whilst processing set of data records. The ensemble model 110 may comprise a set of component models, each component model having a relative weighting.

The scoring computation system 150 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The scoring computation system 150 may include an initializing component 410 for loading the distributed data structure 120 with a first dataset 130, each partition having loaded data in the form of a set of pairs of data formed of a record to be scored and a partial score for that record. The initializing component 410 may include a list of component models 411 of the ensemble model 110 provided in order of decreasing weighting of the component models.

The scoring computation system 150 may include a component model selecting component 412 for selecting a component model from the next in the list 411 when a new component model is required.

The scoring computation system 150 may include a component model processing component 413 for processing the records in parallel across the partitions for the selected component model including updating the partial score for each record. The partial scores for the records may be maintained in a partial score data structure.

The scoring computation system 150 may include a score sufficiency component 420 for determining for each record in the first dataset if a partial score for a record meets an accuracy threshold. If a partial score for a record does not meeting the accuracy threshold, the record is retained in the first dataset in order to be scored by a subsequently selected component model. If the partial score for a record does meet the accuracy threshold, the record and its updated partial score may be moved to result dataset to provide a final score for the record.

The component model selecting component 412 may select a next component model in the ensemble model 110 from the list 411 in order of decreasing weighting unless there are no more component models in the ensemble model or there are no remaining records in the first dataset.

A first dataset checking component 414 may be provided in the scoring computation system 150 to check if there are any remaining records in the first dataset in order to prompt the scoring computation system to select a next component model.

The scoring computation system 150 may include an accuracy setting component 415 for setting an accuracy threshold for a partial score for a record.

In one embodiment, the score sufficiency component 420 may be based on propensity based scoring for binary classification problems and may include: a bound setting component 421 for setting a lower bound and an upper bound for a record; a record scoring component 422 for scoring a record using a component model with a weighting, wherein the score is between the lower bound and the upper bound; and a bound updating component 423 for updating the lower and upper bounds for the record with the score weighted with the component model weighting; and an outcome component 424 for comparing the lower and upper bounds with the accuracy threshold to determine if the score is sufficiently accurate.

In another embodiment as described above, the score sufficiency component 420 may use a method for classification in situations where the underlying component models produce a prediction from a set of classes.

Worked Example

A worked example is provided to illustrate the described method using propensity based scoring for binary classification. An ensemble model has two predictors, a and b, and consists of three component models:

Component Model 1, weight 0.6: score=if (a>10) then 0.1 else 0.6 endif.

Component Model 2, weight 0.3: score=if (b>2) and (b<6) then 0.4 else 0.9 endif.

Component Model 3, weight 0.1: score=if (a>9) or (b<3) then 0.2 else 0.5 endif.

Six records are considered to be scored, divided into two partitions.

Initial data—6 sample records in 2 partitions, (lwb,upb) initialized to (0.0,1.0).

| Data Partition 1 | | | | Data Partition 2 | | | |
|---|---|---|---|---|---|---|---|
| a | b | Last score | (lwb, upb) | a | b | Last score | (lwb, upb) |
| 11 | 5 | | (0.0, 1.0) | −3 | 5 | | (0.0, 1.0) |
| 5 | 12 | | (0.0, 1.0) | 14 | 2 | | (0.0, 1.0) |
| 2 | 0 | | (0.0, 1.0) | 10 | 5 | | (0.0, 1.0) |

| Results Partition 1 | | | | Results Partition 2 | | | |
|---|---|---|---|---|---|---|---|
| a | b | Last score | (lwb, upb) | a | b | Last score | (lwb, upb) |

After scoring component model 1, scoring data partition 1 and data partition 2 in parallel:

| Data Partition 1 | | | | Data Partition 2 | | | |
|---|---|---|---|---|---|---|---|
| a | b | Last score | (lwb, upb) | a | b | Last score | (lwb, upb) |
| 5 | 12 | 0.6 | (0.36, 0.76) | −3 | 5 | 0.6 | (0.36, 0.76) |
| 2 | 0 | 0.6 | (0.36, 0.76) | 10 | 5 | 0.6 | (0.36, 0.76) |

| Results Partition 1 | | | | Results Partition 2 | | | |
|---|---|---|---|---|---|---|---|
| a | b | Last score | (lwb, upb) | a | b | Last score | (lwb, upb) |
| 11 | 5 | 0.1 | (0.06, 0.46) | 14 | 2 | 0.1 | (0.06, 0.46) |

After scoring component model 2, scoring data partition 1 and data partition 2 in parallel:

| Data Partition 1 | | | | Data Partition 2 | | | |
|---|---|---|---|---|---|---|---|
| a | b | Last score | (lwb, upb) | a | b | Last score | (lwb, upb) |
|  |  |  |  | −3 | 5 | 0.4 | (0.48, 0.58) |
|  |  |  |  | 10 | 5 | 0.4 | (0.48, 0.58) |

| Results Partition 1 | | | | Results Partition 2 | | | |
|---|---|---|---|---|---|---|---|
| a | b | Last score | (lwb, upb) | a | b | Last score | (lwb, upb) |
| 11 | 5 |  | (0.06, 0.46) | 14 | 2 |  | (0.06, 0.46) |
| 5 | 12 | 0.9 | (0.63, 0.73) |  |  |  |  |

| Results Partition 1 | | | | Results Partition 2 | | | |
|---|---|---|---|---|---|---|---|
| a | b | Last score | (lwb, upb) | a | b | Last score | (lwb, upb) |
| 2 | 0 | 0.9 | (0.63, 0.73) |  |  |  |  |

After scoring component model 3, scoring data partition 1 and data partition 2 in parallel:

| Data Partition 1 | | | | Data Partition 2 | | | |
|---|---|---|---|---|---|---|---|
| a | b | Last score | (lwb, upb) | a | b | Last score | (lwb, upb) |

| Results Partition 1 | | | | Results Partition 2 | | | |
|---|---|---|---|---|---|---|---|
| a | b | Last score | (lwb, upb) | a | b | Last score | (lwb, upb) |
| 11 | 5 |  | (0.06, 0.46) | 14 | 2 |  | (0.06, 0.46) |
| 5 | 12 |  | (0.63, 0.73) | −3 | 5 | 0.2 | (0.53, 0.53) |
| 2 | 0 |  | (0.63, 0.73) | 10 | 5 | 0.5 | (0.5, 0.5) |

Figure 5:
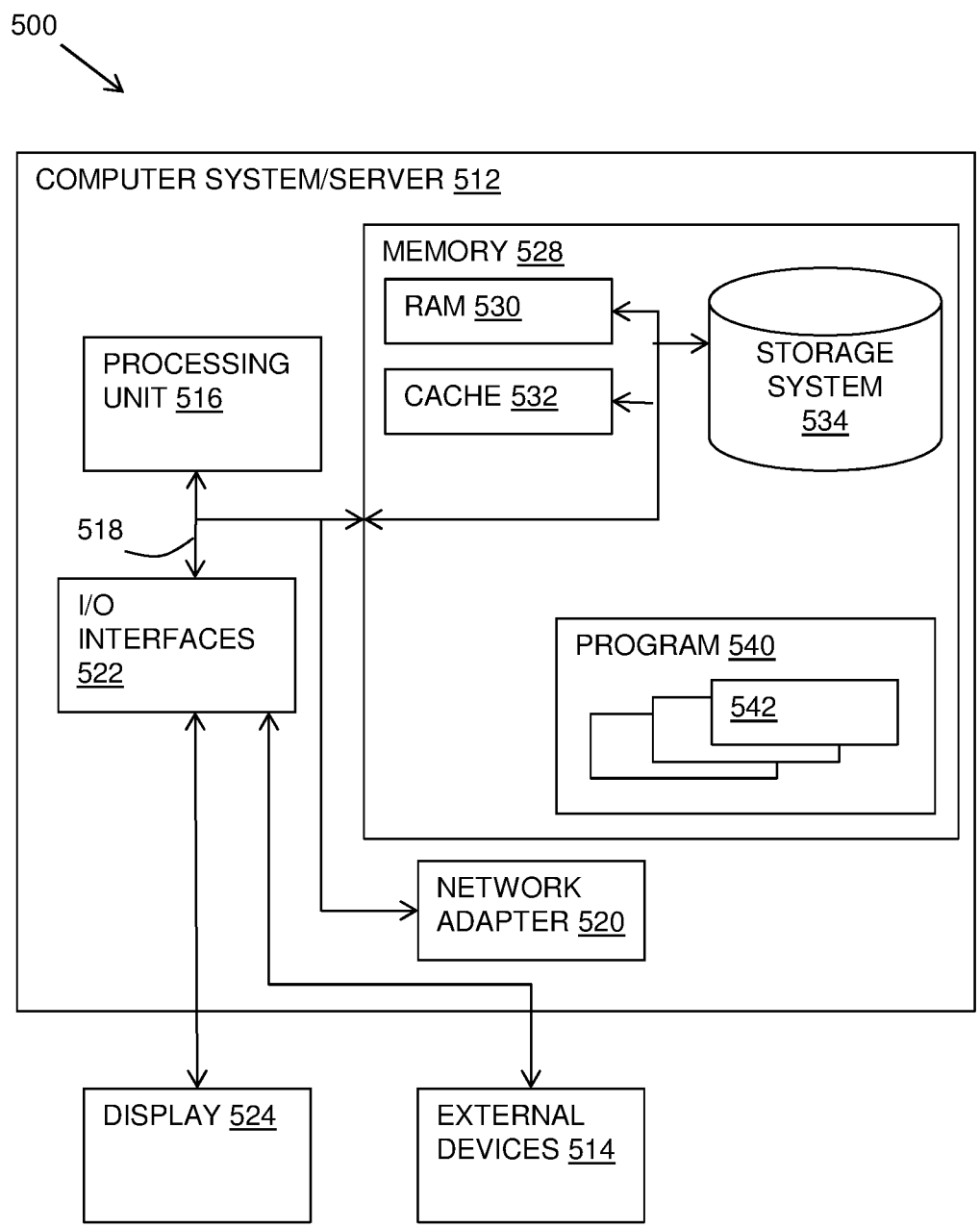
FIG. 5 is a block diagram of an embodiment of a computer system or cloud server in which the present invention may be implemented.

Referring now to FIG. 5, a schematic of an example of a system 500 in the form of a computer system or server is shown.

A computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, a computer system/server 512 is shown in the form of a general-purpose computing device. The components of the computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
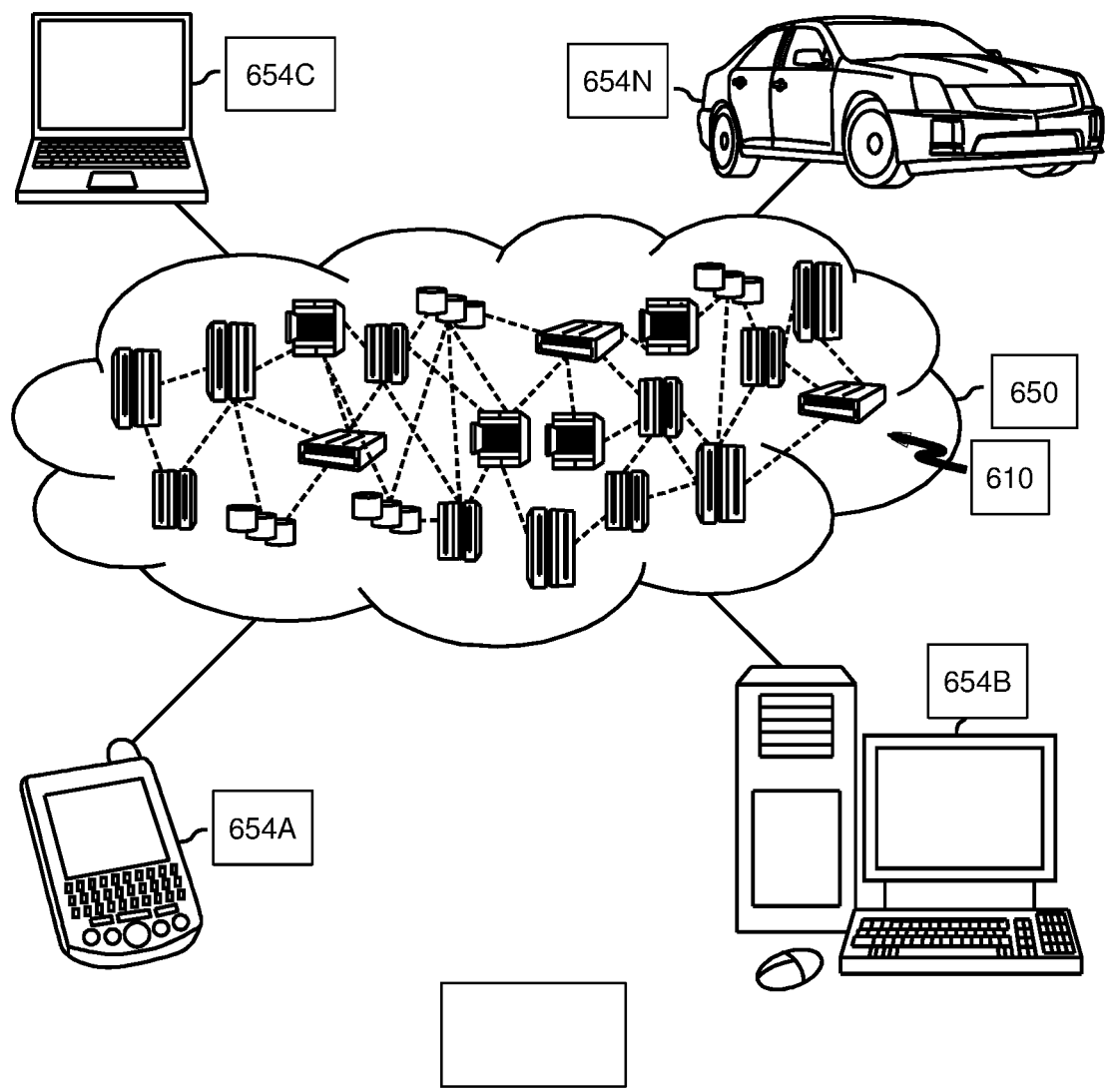
FIG. 6 is a schematic diagram of a cloud computing environment in which the present invention may be implemented.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
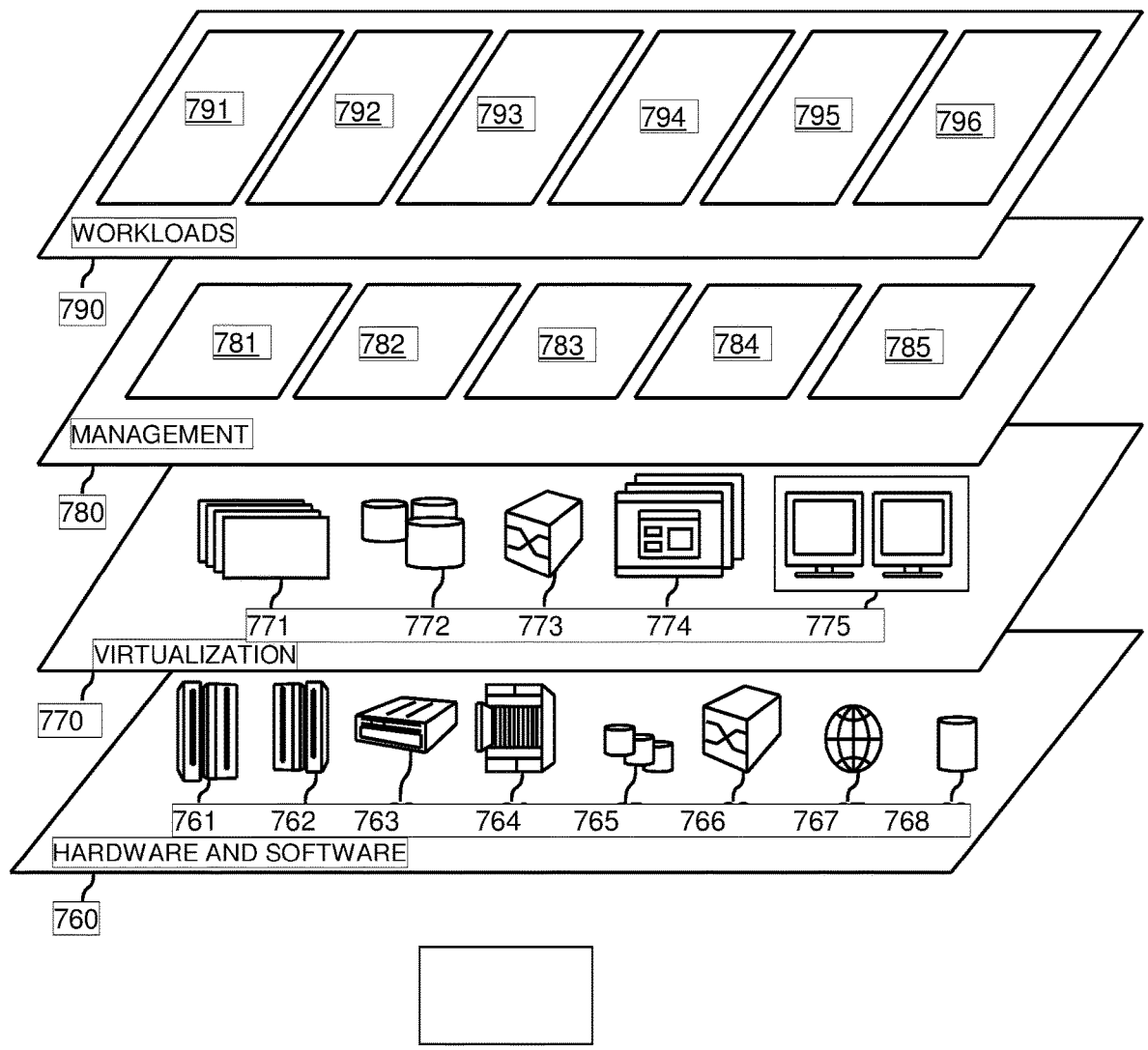
FIG. 7 is a diagram of abstraction model layers of a cloud computing environment in which the present invention may be implemented.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and predictive ensemble modeling processing 796.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer implemented method of parallel scoring an ensemble model, the ensemble model comprising a set of component models, each component model having a relative weighting, the method comprising:
   loading data into a first distributed data structure comprising a plurality of partitions, each partition having loaded data in a set of pairs of data formed of a record to be scored and a partial score for that record;
   selecting a component model in the ensemble model in order of decreasing weighting and processing the records in parallel across the partitions including updating the partial score for each record;
   for each record in the first distributed data structure determining if a partial score meets an accuracy threshold, and wherein:
   in response to a partial score for a record not meeting an accuracy threshold retaining the record in the first distributed data structure in order to be scored by a subsequent component model; and
   in response to the partial score for a record meeting the accuracy threshold, moving the record and updated partial score to an output result data structure to provide a final score for the record.

2. The method as claimed in claim 1, including selecting a next component model in the ensemble model in order of decreasing weighting unless there are no more component models in the ensemble model or there are no remaining records in the first distributed data structure.

3. The method as claimed in claim 2, wherein if there are no remaining records in the first distributed data structure, all records have a partial score of sufficient accuracy without selecting all component models of the ensemble model.

4. The method as claimed in claim 1, wherein when each record has an associated partial score data structure for maintaining a current partial score and when each record is processed its partial score is updated to yield a more accurate estimate of what a full score would be.

5. The method as claimed in claim 1, including setting an accuracy threshold for a partial score for a record to determine when a partial score is sufficiently accurate to be accepted, wherein the type of accuracy threshold depends on the type of component models in the ensemble model.

6. The method as claimed in claim 1, wherein determining if the accuracy threshold is met uses a binary classification based on propensity.

7. The method as claimed in claim 6, wherein the binary classification based on propensity includes:
   setting a lower bound and an upper bound for a record;
   scoring a record using a component model with a weighting, wherein the score is between the lower bound and the upper bound;
   updating the lower and upper bounds for the record with the score weighted with the component model weighting; and
   comparing the lower and upper bounds with the accuracy threshold to determine if the score is sufficiently accurate.

8. The method as claimed in claim 1, wherein the component models produce a prediction from a set of classes and determining if the accuracy threshold is met uses a method for determining if a partial score for a record is a best estimate of a classification prediction.

9. The method as claimed in claim 1, wherein the method is provided as a service in a cloud environment.

* * * * *